INVENTORS
SADAYASU OTA
KIYOSHI OKANO
KAZUO HAYASHI
BY Reynolds & Christensen
ATTORNEYS United States Patent Office 3,198,574
Patented Aug. 3, 1965

3,198,574
DENTAL APPARATUS
Sadayasu Ota, Kiyoshi Okano, and Kazuo Hayashi, all of Kyoto, Japan, assignors to Kabushiki Kaisha Morita Seisakusho, Kyoto, Japan, a corporation of Japan
Filed Feb. 10, 1964, Ser. No. 343,664
Claims priority, application Japan, Feb. 19, 1963, 38/8,327
16 Claims. (Cl. 297—191)

This invention relates to dental apparatus, and more particularly to a dental operating chair provided with various dental instruments, implements, appliances and devices to be employed in the practice of dentistry.

Conventional dental apparatus of the type comprises a chair for a patient to be seated in and a separate dental equipment unit located adjustment thereto and provided with various dental instruments such as syringes and handpieces, which the dentist employs during various aspects of dental treatment. The positions the dentist takes during the dental work relative to the chair the patient is seated in is limited to the right-hand side and the back of the chair, and the equipment unit is located generally near the left-hand side of the chair. Consequently, at whichever of the two positions the dentist may stand, he is so far away from the unit that when he wants to take up any of the instruments, he has to walk around to reach it or ask his assistant to take it up and hand it over to him. In order to overcome the disadvantage, it has heretofore been proposed to removably mount dental instruments on the back of the chair back. Such arrangement appears convenient since the instruments are always placed within reach of the dentist. However, when the chair is inclined backward as occasions demand during treatment, the dentist cannot see the instrument mounted on the back of the chair, and he must either grope for them or bend forward to look at them. This obviously is very inconvenient.

Accordingly, the principal object of the invention is to provide a dental operating chair equipped with various dental instruments so disposed as to be always within easy reach of, and directly visible to, the dentist, regardless of his position and the inclination of the chair.

In accordance with the invention, dental instruments such as springes, drills, etc. are so mounted at one or both sides of the chair that they may be removed therefrom conveniently into different operative positions, with their respective hoses simultaneously drawn out from inside the chair. Therefore, wherever the operator may happen to be and to whatever degree the chair may have been inclined, he can always see and easily reach the instruments.

Figure 1:
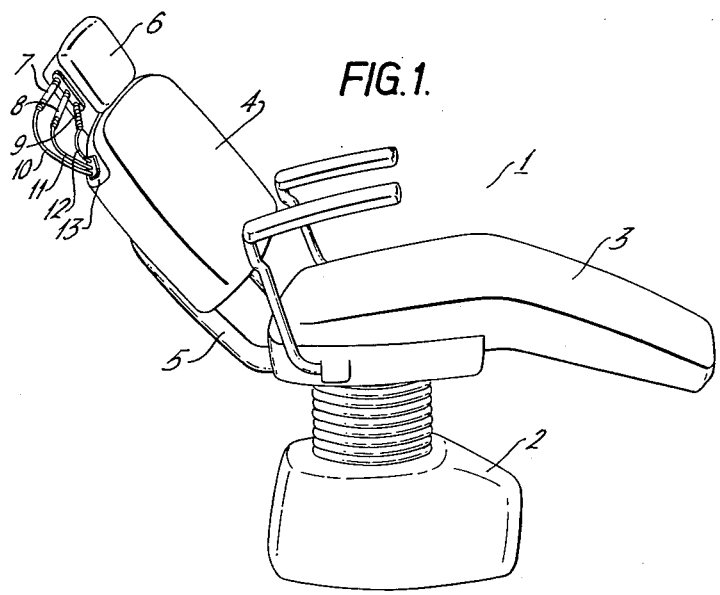
Figure 2:
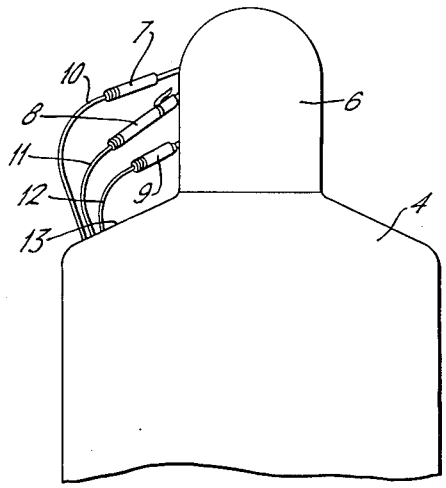
Figure 3:
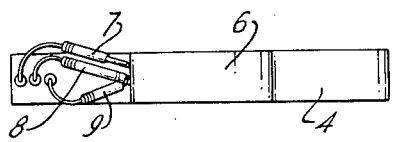
Figure 4:
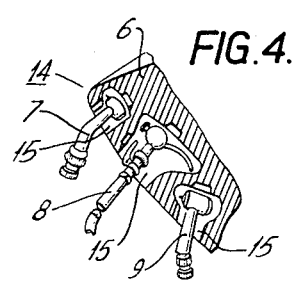
Figure 5:
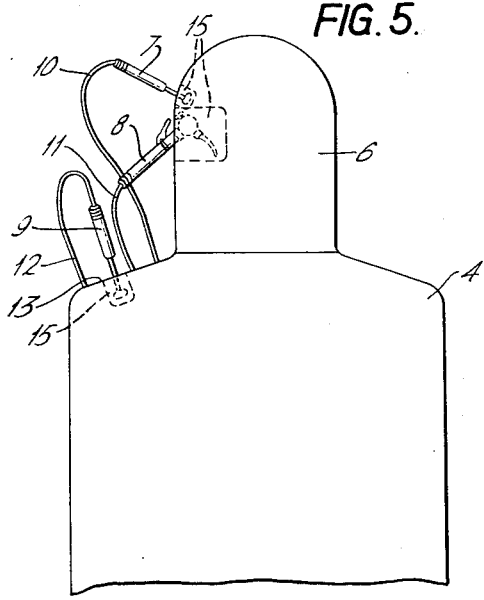
Figure 6:
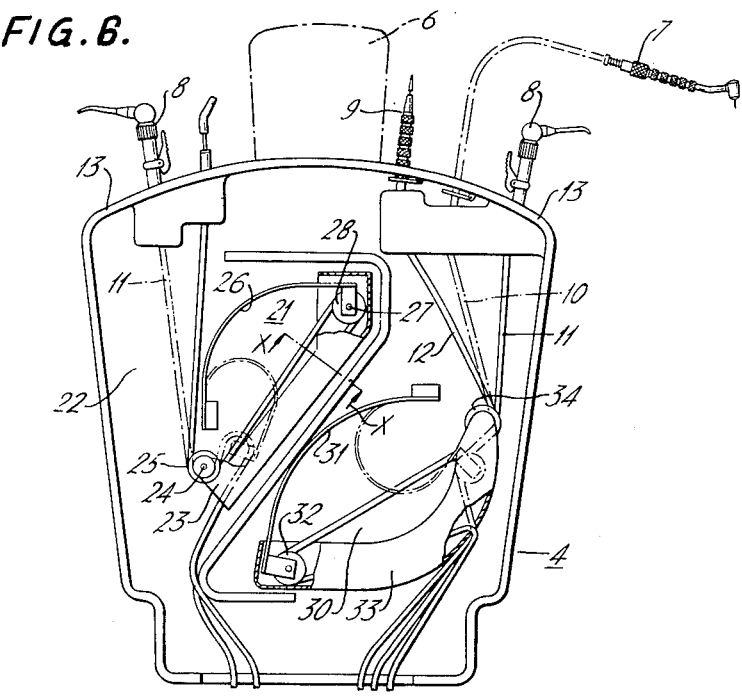
Figure 7:
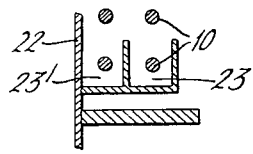
Figure 8:
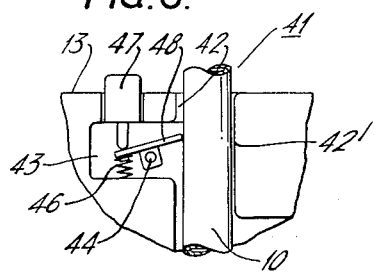

Other objects, features and advantages of the invention will be apparent from the following detailed description of some embodiments thereof with reference to the accompanying drawings, wherein:

FIG. 1 is a respective view of the dental chair;
FIG. 2 is a front view of part of FIG. 1;
FIG. 3 is a top end view of FIG. 2;
FIG. 4 is a fragmentary enlarged view, partly in section, of the means for holding various dental instruments while not in use;
FIG. 5 is a front view of a portion of another embodiment of the invention;
FIG. 6 is a front view of the chair back with its front wall taken away to show the interior mechanism;
FIG. 7 is a fragmentary sectional view taken on the line X—X in FIG. 6; and
FIG. 8 is a fragmentary view of the shoulder of the chair back illustrating the means for preventing the relative movement of a hose connected to an instrument.

The apparatus of the invention comprises, a chair composed of a seat, a back so mounted thereon as to be able to be inclined to any desired degree relative to the seat, and a headrest attached to the top of the chair back; and as many various dental instruments as are required for the purpose of dental work.

Referring now in detail to the drawings, there is shown a dental operating chair, generally designated at 1, which comprises a base 2, a seat 3 mounted thereon, a back 4 supported by a frame 5 and connected to the seat, and a headrest 6 attached to the top of the chair back. The seat 3 is suitable shaped for a patent to be comfortably seated in and is vertically movable relative to the base by any suitable means such as oil pressure or electrical mechanism. The chair back 4 is also suitably shaped for the patient to lean against and is so supported by the frame 5 as to be able to be inclined to any desired degree relative to the chair seat 3. The headrest 6 may also be so constructed as to be able to be freely inclined with respect to the chair back 4. So far there is nothing different from conventional chairs of the type.

In accordance with the invention, however, the hoses, to the outer ends of which different dental instruments are connected, are so arranged that they are drawn out from inside the chair, most preferably, the chair back as will be explained in detail later. The hoses may also come out of the chair base or a device provided for the purpose and positioned adjacent to the chair or attached thereto. There may be provided as many different dental instruments as are required for dental work to performed. In the illustrated embodiments of FIGS. 1 to 5, three instruments are provided, by way of example, that is, an air turbine contra angle hand piece 7, a warm air or spray syringe 8 and a low-speed turbine contra angle hand piece 9. These instruments are connected to the outer ends of their respective hoses 10, 11, 12, all coming out of the chair back 4 at its one shoulder 13.

One of the most important features of the invention is that when not in use, these instruments are held or supported immediately above one or both of the two shoulders of the chair back and laterally, in one or opposite directions, of the headrest. To put it otherwise, the instruments are held or supported in one or both of the two spaces which may be approximately defined as follows: First consider two spaced planes substantially including the front and back surfaces of the chair back 4 and expanding around the shoulders 13 thereof. Then, cut these two parallel planes by (1) a plane substantially including the top point or surface of the headrest 6, (2) a plane substantially including one of the opposite side surfaces of the headrest, and (3) a plane substantially including the upper surface of one of the two shoulders of the chair back 4; and at one side of the headrest there will result a space defined by the above five planes but expanding laterally of that side of the headrest. Preferably, the space is further defined by a plane substantially including one of the opposite side surfaces of the chair back 4. It will be easily seen that at the other side of the headrest, another similar space can be defined in a similar way. Each of the two spaces thus defined above both shoulders of the chair back and at both sides of the headrest will be a relatively flat, approximately rectangular solid in shape.

The most distinguishing characteristic of the invention is that while not in use, the instruments are held in one or both of the above defined spaces. All the instruments that are provided may be held in one of the two spaces, practically in the space at the right-hand side of the headrest as one is seated in the chair, as shown in FIG. 1. It is also expected that especially in case many instruments are to be provided, some of them are held in the right-hand space and the others in the left-hand space, as shown in FIG. 6. It is never intended that the whole body of each instrument should be completely enclosed within the space, while held there for rest, but some part of it, for example, its rear end may project out of the space.

Now will be the time to explain, by way of example, means for holding the instruments in the manner described above. The holding means, generally designated at 14, comprises as many holes 15 as there are instruments to be held. In the illustrated embodiments of FIGS. 1 to 5, three holes are provided corresponding respectively to the hand piece 7, syringe 8, and hand piece 9. Each of the holes is of such shape that the head portion of the corresponding instrument may be fitted into the hole and stay therein through engagement with the inner wall thereof. When each of the instruments is to be returned to the holding means, the operator, holding it suitably inclined, may insert its head portion into the corresponding hole 15 and then correct the inclination so as to make the head portion come into secure engagement with the inner wall of the hole.

In FIGS. 1 to 4, all of the holes are formed in one side surface of the headrest 6. If desired, some or all of them may be formed in one or both shoulders 13 of the chair back 4. In FIG. 5, for example, the hand piece 9 is held at one shoulder of the chair back, with the hand piece 7 and syringe 8 being held at the side of the headrest as before.

In order to make it easier for the operator to take up any one of the instruments he wants to use, the instruments may be held in their respective holes in such a manner that each of them is suitably spaced from another along the length of the side wall of the headrest 6, as shown in FIGS. 1, 2 and 4. Also, it is preferable to have the instruments so held that each of their axes is suitably aslant to the plane of the side of the headrest 6 or the shoulder face of the chair back 4. Such consideration is advantageous for the following reasons: Syringes are of such shape as to be gripped in the palm, while contra angle hand pieces are so shaped as to be held like a pen. Therefore, if these instruments are held suitably inclined in their respective holes, the dentist can from the beginning grip them in his palm or hold them with his fingers like a pen in accordance with their shapes, and need not change the manner of holding afterward.

In the embodiment shown in FIG. 6, there are shown syringes and handpieces, five in all. In this case, when not in use, these instruments are supported substantially upright on both the shoulders 13 of the chair back 4, with their rear ends fitted into their respective holes formed into the shoulders.

As previously mentioned, the contra angle hand pieces and syringes are connected at their rear ends to their respective supply hoses. FIG. 6 shows a mechanism for drawing the hoses in and out. The mechanism is generally designated at 21 and shown enclosed in the chair back 4, although it may be contained inside the base 2. The mechanism 21 is secured to the front or back wall 22 of the chair back 4 and comprises a guide channel 23, a roller 25 whose axis 24 is mounted at one end of the channel 23, a resilient plate 26 fixed at one end to the wall 22, and another roller 28 whose axis 27 is mounted at the other free end of the resilient plate 26. A length of hose 11 having its one end connected to a suitable source of chemicals, air, water, or the like, passes over roller 28 and then roller 25, and is drawn outside the back chair at its shoulder 13 so as to be connected to an instrument, say, syringe 8. When the instrument 8 is not in use, as shown in FIG. 6, the roller 28 is urged by the resiliency of the plate 26 into its normal position, that is, toward the end of the channel 23 opposite to where the roller 25 is positioned. Under the condition, the hose 11 is so tensioned that the instrument 8 is pulled up to the shoulder 13 of the chair back to be securely held there. When the arrangement is such that the instrument is to be held at the side of the headrest 6, it is necessary that the instrument so held should not be unnecessarily pulled out of the holding means by the tension of the hose. In this case, means for preventing the reaction of the hose into the chair back may advantageously be provided at a place where the hose comes out of it, as will be described later. Alternatively, the hose 11 may be of such length that when it is tensioned inside the chair back in the above mentioned manner, there may be left outside the chair back a sufficient length of the hose to enable the instrument to stay in its holding hole 15.

When the dentist takes the instrument 8 out of its holder into different operative positions, the hose 11 following it is drawn out against the force of the resilient plate 26. This causes the roller 28 to be moved within the channel 23 toward roller 25 and the plate 26 to be bent as shown in dot-and-dash lines in FIG. 6. When the dentist relieves the pull on the hose in order to return the instrument into its holder, the plate 26 brings the roller 28 back to its original normal position, simultaneously causing the hose to be drawn into the chair back 4.

It is necessary that there be provided as many mechanisms for retracting the hose as there are dental instruments. In such an instance, a plurality of guide channels may be put together. FIG. 7 shows two guide channels 23 and 23' arranged side by side. If such arrangement does not suffice, as many hose-retracting mechanisms of similar construction as required may be added. In FIG. 6, for example, an additional one, generally indicated at 30, is shown enclosed in the chair back 4. The mechanism 30 also comprises a resilient plate 31, rollers 32 and 34, and a guide channel 33. The arrangement of these component members and, consequently, the operation of the mechanism 30 are quite the same as with the mechanism 21 described hereinbefore, and will therefore require no further explanation.

FIG. 8 shows a means for preventing the hose from being unnecessarily drawn into the chair back 4 by the force of the resilient plate 26 or 31. This means, generally indicated at 41, is provided in the shoulder 13 of the chair back 4 where the hose comes out therefrom. There is a bore 42 formed for the hose to pass through, and also a laterally extending recess or hole 43 in communication with the bore 42. Inside the lateral hole 43, there are provided a lever 48 pivoted at 44, a spring 46 urging the lever to rotate clockwise in the figure, and a push-button 47 having its upper end projecting above the level of the shoulder surface 13 of the chair back 4 and its lower end bearing against one end of the lever 45. The opposite end of the lever 48 is held against the side of the hose 10 to press it against the inner wall 42' of the bore 42, thereby checking the sliding movement of the hose. When the hose is to be released, the button 47 is pushed down to tilt the lever 48 counterclockwise against the force of the spring 46, whereupon the lever 48 lets the hose free to be drawn in or out.

It is now believed to have become apparent that the invention has many advantages over similar prior art devices: With the apparatus of the invention, the various dental instruments to be manipulated by the dentist during different stages of dental work are always provided within convenient reach of, and in positions directly visible to, the dentist, regardless of his position and the inclination of the chair. This not only enables the dentist to take up any of the instruments he desires without any attendant helping him in such action and wherever he may happen to be standing around the chair, but also greatly reduces his fatigue which would otherwise be caused to increase by repeated bending of the body or walking around. Moreover, the distance between the mouth of the patient undergoing dental work and the positions of the instruments as they are held while not in use is so short that when they are in use, only a small length of hose is drawn out, resulting in quite easy manipulation of each of the instruments and good appearance of the whole structure. In addition, the invention has completely eliminated a separate equipment unit or stand required in the prior art, so that there is nothing around the operating chair to obstruct free and efficient performance of the dentist.

It should be recognized that the embodiments disclosed herein are merely illustrative and that further modifications and changes may be made without departing from the true scope and spirit of the invention.

We claim:

1. Dental apparatus comprising: a chair comprising a base, a seat mounted on said base and suitably shaped for a patient to be seated in, a back connected to said seat and so arranged as to be freely inclined relative to said seat, and a headrest attached to the top of said chair back; dental instruments connected to their respective hoses; and means for holding said instruments in the space approximately defined by the planes substantially including the front and back surfaces of said chair back, respectively, a plane substantially including the top of said headrest, a plane substantially including one of the opposite side surfaces of said headrest, a plane substantially including the upper surface of one of the two shoulders of said chair back, and a plane substantially parallel to a plane including one of the opposite side surfaces of said back.

2. Dental apparatus comprising: a chair comprising a base, a seat mounted on said base and suitably shaped for a patient to be seated in, a back connected to said seat and so arranged as to be freely inclined relative to said chair seat, and a headrest attached to the top of said chair back; dental instruments connected to their respective hoses; and means for holding said instruments in the space approximately defined by two planes substantially including the front and back surfaces of said chair back, respectively, a plane substantially including the top of said headrest, a plane substantially including one of the opposite side surfaces of said headrest, a plane substantially including the upper surface of one of the two shoulders of said chair back, and a plane substantially parallel to a plane including one of the opposite side surfaces of said back, and also in the space approximately defined by said two first-named planes, said plane substantially including the top of said headrest, a plane substantially including the other of said opposite side surfaces of the headrest, a plane substantially including the upper surface of the other of said two shoulders of the chair back and a plane substantially parallel to a plane including the other of said opposite side surfaces of said back.

3. Dental apparatus of claim 1, wherein said last-named plane substantially includes one of the opposite side surfaces of said chair back.

4. Dental apparatus of claim 2, wherein said last-named plane defining said first-named space substantially includes one of the opposite side surfaces of said chair back and said last-named plane defining said last-named space substantially includes the other of said opposite side surfaces of the chair back.

5. Dental apparatus of claim 3, wherein said hoses come out of said chair back at said one shoulder, and said instruments-holding means is provided in said one side surface of the headrest.

6. Dental apparatus of claim 3, wherein said hoses come out of said chair back at said one shoulder, and said instruments-holding means is provided in said one shoulder.

7. Dental apparatus of claim 3, wherein said hoses come out of said chair back at said one shoulder, and said instruments-holding means is provided in said one side surface of the headrest and also in said one shoulder.

8. Dental apparatus of claim 4, wherein said hoses come out of said chair back at both its shoulders, and said instruments-holding means is provided in said both shoulders.

9. Dental apparatus of claim 4, wherein said hoses come out of the chair back at both its shoulders, and said instruments-holding means is provided in one of said opposite side surfaces of the headrest and also in said both shoulders.

10. Dental apparatus of claim 1, wherein said hoses come out of said chair back at said one shoulder, and means for preventing the movement of said hoses in and out of said chair back is provided in said one shoulder.

11. Dental apparatus of claim 2, wherein said hoses come out of said chair back at both its shoulders, and means for preventing the movement of said hoses in and out of said chair back is provided in said both shoulders.

12. Dental apparatus of claim 1, wherein said chair back encloses means for drawing said hoses in and out.

13. Dental apparatus of claim 2, wherein said chair back encloses means for drawing said hoses in and out.

14. Dental apparatus comprising in combination: a chair having a seat, a back member movable to selected angles of inclination with respect to said seat, a headrest attached to the top of said back member, and a plurality of dental instruments each having operating means connected thereto, said headrest including dental instruments holding means for holding said instruments extending outwardly therefrom.

15. Dental apparatus as defined in claim 14 wherein said operating means includes a plurality of hoses and said back member includes means enclosing said hoses and yieldingly urging each of said hoses into the interior of said back member.

16. Dental apparatus comprising in combination: a plurality of dental instruments, hose means secured to said instruments, and a chair having a movable back member, said member including dental instrument holding means in the top thereof adapted to hold said instruments in a position protruding upwardly from the top of said back member, and said back member further including means yieldingly urging said hose means into the interior of said back member.

References Cited by the Examiner

UNITED STATES PATENTS

| | | | |
|---|---|---|---|
| 573,601 | 12/96 | Jones | 32—22 X |
| 2,214,775 | 9/40 | Pieper | 32—22 |
| 2,650,990 | 9/53 | Woodruff | 32—22 X |
| 2,692,688 | 10/54 | Callais | 297—191 X |
| 3,044,828 | 7/62 | Fowler | 297—191 |
| 3,129,033 | 4/64 | Emmerson | 297—194 |

FRANK B. SHERRY, *Primary Examiner.*